No. 726,908. Patented May 5, 1903.

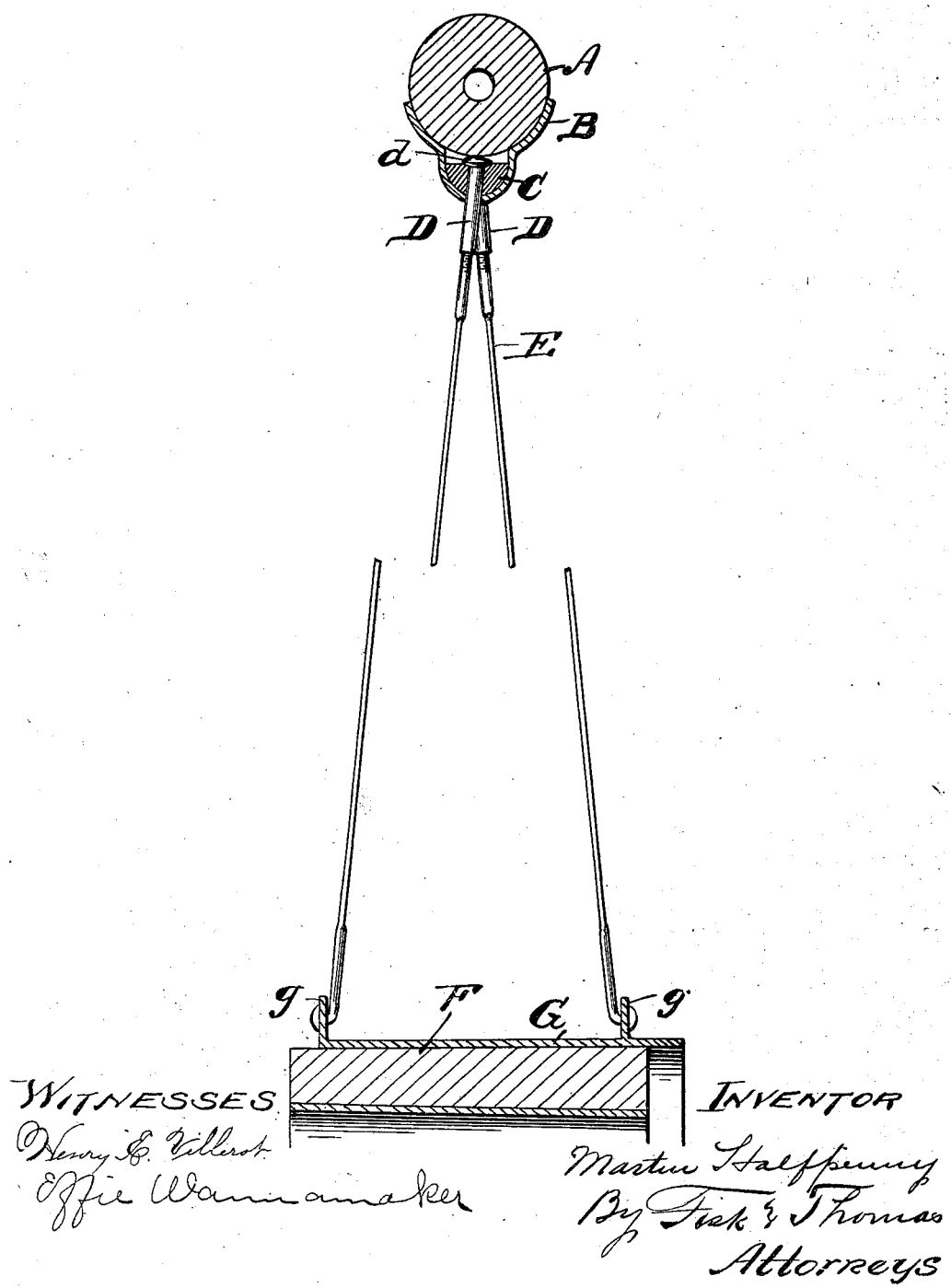

UNITED STATES PATENT OFFICE.

MARTIN HALFPENNY, OF PONTIAC, MICHIGAN, ASSIGNOR TO CANNON METAL WHEEL WORKS, LIMITED, OF PONTIAC, MICHIGAN, A CORPORATION OF MICHIGAN.

CUSHION-TIRED WHEEL.

SPECIFICATION forming part of Letters Patent No. 726,908, dated May 5, 1903.

Application filed August 2, 1902. Serial No. 118,031. (No model.)

*To all whom it may concern:*

Be it known that I, MARTIN HALFPENNY, a citizen of the United States, residing at Pontiac, county of Oakland, State of Michigan, have invented a certain new and useful Improvement in Cushion-Tire Wheels; and I declare the following to be a full, clear, and exact description of the invention, such as will enable others skilled in the art to which it pertains to make and use the same, reference being had to the accompanying drawing, which forms a part of this specification.

My invention relates to an improvement in cushion-tire or pneumatic-tire wheels, shown in the accompanying drawing and more particularly set forth in the accompanying specification and claim.

The drawing shows a cross-sectional view through a portion of a wheel.

The object of my invention is to provide a metallic rim for cushion or pneumatic tires, having located within said rim a wooden rim through which the nipple designed to receive the end of the spokes projects from the inside, the object being to form a cushion to take up the slack that may occur in the spokes.

Referring to the letters of reference shown on the drawing, A is the tire; B, a metallic rim, having a wooden rim C located within the same.

D D are the nipples, being provided with an enlarged head $d$ on the inside and screw-tapped to receive the spokes E, as in the ordinary way.

F is the hub, preferably of wood, provided with a metallic collar G, having flanges $g$, to which the spokes are engaged.

It will be seen that the wood rim C serves as a cushion to take up the ordinary expansion of the spokes, keeping them taut at all times. It also serves as an enlarged bearing for the nipples D D, providing sufficient surface to insure against any lateral movement.

Having thus described my invention, what I claim is—

In a vehicle-wheel, the combination of the tire, a metallic rim B to receive said tire having a channel formed integral therewith, a wooden rim C housed within said channel, spokes E, nipples D provided with an enlarged head $d$ bearing against the inside of the wooden rim, said nipples projecting through the wooden rim and channel to engage the spokes whereby the expansion of the wooden rim due to the compression secured by engaging the nipples to the spokes provides a tension on the spokes, substantially as described.

In testimony whereof I sign this specification in the presence of two witnesses.

MARTIN HALFPENNY.

Witnesses:
S. E. THOMAS,
THOMAS M. LITTLE.